United States Patent [19]

Huls et al.

[11] 4,239,171
[45] Dec. 16, 1980

[54] BOOK SUPPORT

[76] Inventors: Edward Huls; Christina Huls, both of 4801 Kahala Ave., Honolulu, Hi. 96816

[21] Appl. No.: 873,811

[22] Filed: Jan. 31, 1978

[51] Int. Cl.² ............................................ F16M 13/00
[52] U.S. Cl. ..................................... 248/558; 248/165; 248/188.7; 248/441 A; 248/518; 248/529
[58] Field of Search .................. 248/150, 165, 441 A, 248/460, 188.7, 511-559

[56] References Cited
U.S. PATENT DOCUMENTS

| 1,005,750 | 10/1911 | Schwaderer | 248/529 X |
|---|---|---|---|
| 1,261,363 | 4/1918 | Crist | 248/165 |
| 2,388,435 | 11/1945 | Puerner et al. | 248/441 A |
| 2,673,453 | 9/1956 | Palino | 248/518 X |
| 3073,056 | 1/1963 | Russell | 248/441 A |
| 3,310,180 | 3/1967 | Neagle | 248/165 X |
| 3,350,150 | 10/1967 | Schwarm | 248/441 A |
| 3,637,179 | 1/1972 | Marshak | 248/165 X |
| 3,719,340 | 3/1973 | Norton | 248/529 X |
| 3,731,895 | 5/1973 | Petrie | 248/529 |
| 3,883,108 | 5/1975 | Swartz | 248/460 |

FOREIGN PATENT DOCUMENTS

| 670894 | 9/1963 | Canada | 248/530 |
|---|---|---|---|
| 1225470 | 7/1960 | France | 248/150 |
| 1518012 | 2/1968 | France | 248/441 A |

Primary Examiner—William H. Schultz
Attorney, Agent, or Firm—James Creighton Wray

[57] ABSTRACT

A holder for an open book formed of a single piece of transparent plastic shaped to hold the book in a more or less vertical position, incorporating a spring clip on the back. A pole is attached to the holder. The bottom of the pole is shaped for ready insertion into the ground, and also designed to mount a plurality of legs attached by joints or pegs and a deformable ring. The book holder can be used without legs on a soft surface (e.g., a beach) or with legs on a hard surface.

14 Claims, 5 Drawing Figures

U.S. Patent    Dec. 16, 1980    4,239,171
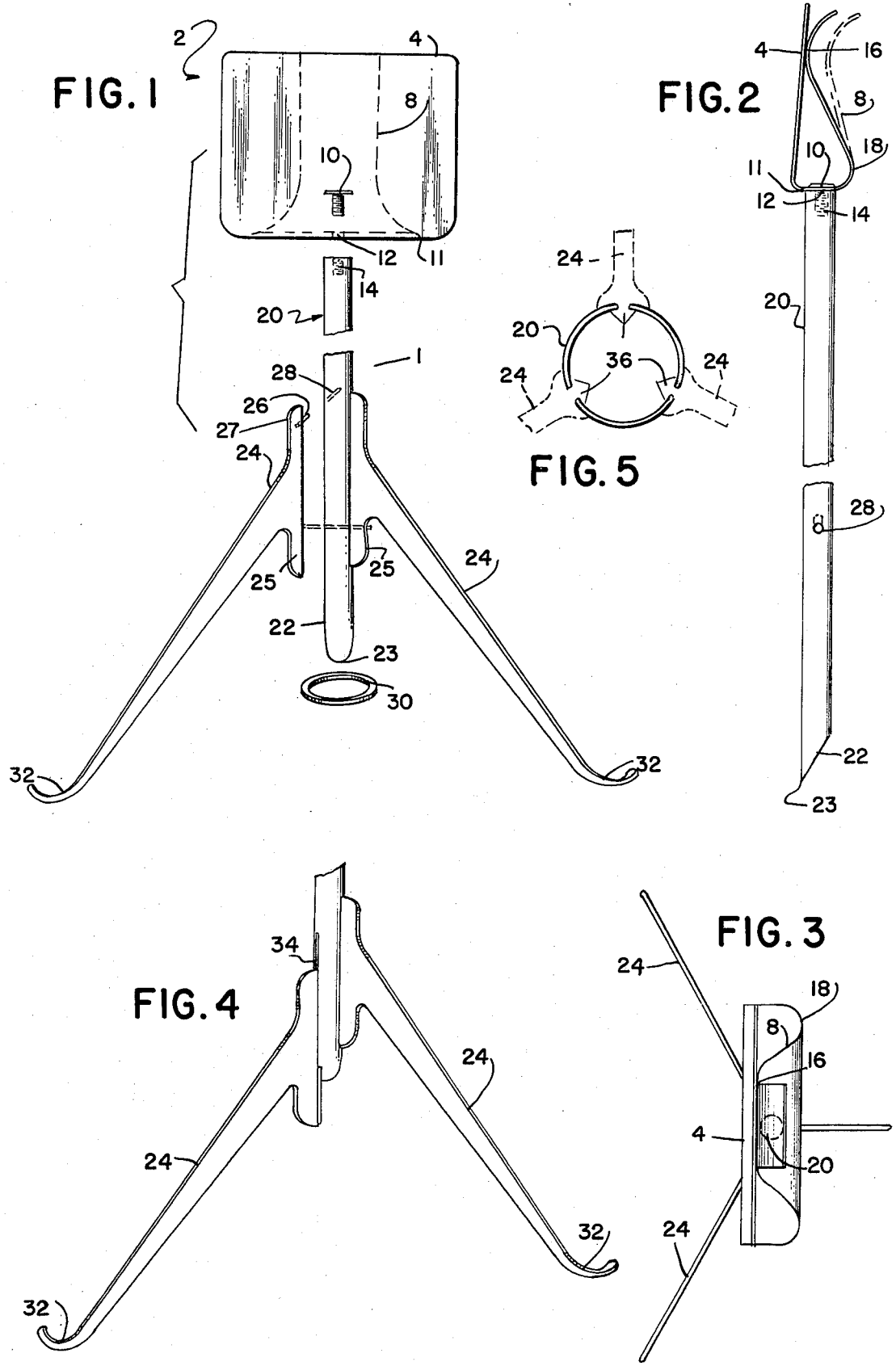

BOOK SUPPORT

BACKGROUND OF THE INVENTION

1. Field of the Invention

The present invention relates generally to leisure devices and more specifically to leisure reading devices while a reader is in a supine position.

2. Description of the Prior Art

Pertinent art is found in Class 248 Supports, subclasses 165 and 445 and Design Class 6, subclasses 18, 20, 155, 176, and 184, the official classification of the United States Patent and Trademark Office. Examples of the most pertinent art found are:

| | |
|---|---|
| 150,320 | 2,546,283 |
| 375,847 | 3,350,150 |
| 1,017,698 | 3,476,348 |
| 1,423,951 | 3,664,629 |
| 1,671,231 | 3,740,015 |
| 2,235,367 | 3,790,770 |
| 2,333,376 | and |
| Design patents: | |
| 126,561 | 228,998 |
| 220,911 | 236,667 |

A number of problems remain in prior art disclosures regarding the difficulty of reading in a prone position. U.S. Pat. Nos. Des. 220,911 and Des. 228,998 show book holders similar to the present invention; however, no leg or pole is provided in either case. U.S. Pat. Nos. 3,350,150, 3,476,348, 3,740,015 and 3,790,770 show transparent plastic or Plexiglas panels through which a book may be read. None except U.S. Pat. No. 3,350,150 shows a spring clip in addition to the plastic panels.

U.S. Pat. Nos. 1,017,698 and 2,546,283 show book supports using glass panels through which a book may be read. U.S. Pat. Nos. 1,671,231, 2,235,367, 2,333,376 show spring clips which hold a book open at the sides requiring readjustment after each page is turned. U.S. Pat. Nos. 375,847 and 1,423,951 show rings which lock legs together. U.S. Pat. No. 375,847 differs from the present invention as it slides from the top down rather than from the bottom up. U.S. Pat. No. 1,423,951 has two rings, one for the top and the other for the bottom. U.S. Pat. No. 150,320 shows a leg support similar to option two of the present invention. U.S. Pat. Nos. Des. 126,561 and Des. 236,667 show alternative approaches to the problem of reading while in a supine position with U.S. Pat. No. Des. 126,561 showing a pointed stand which may be driven into the ground.

Although several prior art disclosures, notably U.S. Pat. No. 3,350,150 and Des. 228,998, incorporate some feature of the present invention, none of the prior art disclosures have all the features and thus the flexibility of the present invention for use not only on soft surfaces like a beach but also hard surfaces like floors.

SUMMARY OF THE INVENTION

The present invention is an improvement over the prior art reading stand devices for reading while in a prone position.

The present invention is a book holding support and attached pole all made of Plexiglas. The book holding support comprises a flat front face, a bottom, and an arched flexible curve which acts as a spring to keep the book compressed against the inner face of the Plexiglas holder. A screw located at the bottom face of the book holder attaches to a cylindrical Plexiglas pole. The pole is angularly cut at one end forming a forty-five degree angle and providing a circular sharpened edge. The circular sharpened edge allows the pole to be wedged into soft surfaces such as sand.

The present invention may also be used on hard surfaces such as floors. Dowel holes located in a lower portion of the Plexiglas pole allow legs with elongated shanks to be attached to the pole. The legs have elongated fastening means and securing dowels which are angularly connected to the pole through the dowel holes. The legs are held rigidly against the pole by a nylon locking ring which slides upward from the bottom of the pole. The ring compresses the lower elongated fastening means of the legs parallel to the length of the pole. The ends of the legs are curved upward to provide stability on hard surfaces.

The legs can also be attached to the pole through narrow rectangular slots which are found on the lower portion of the pole. The elongated fastening means of the poles have male projections which slide upward into the rectangular slots. No locking ring is necessary to hold the legs in place. The present invention combines aesthetics with utility. The transparency of the Plexiglas allows the user to read through the plastic directly. Additionally, the spring action of the flexibly arched curve not only keeps the book pressed tightly against the face of the plastic but also keeps pages of the book from being blown by winds. This is especially significant while reading outdoors.

The transparency of the back support and the pole gives the book support an ethereal quality which adds to a user's enjoyment. The simplicity of using the spring clip to keep the book pressed tightly against the face adds to the user's convenience and minimizes the attention the user must pay to the device itself.

OBJECTS OF THE INVENTION

Objects of the invention are to provide a reading stand apparatus comprising a book holding support means, a pole having openings in a lower portion for attaching legs, connecting means for connecting the pole to the book holding support means, a plurality of legs having elongated shank portions and having proximal and distal ends, the proximal ends having elongated fastening means connected to the pole or angular relation to the shanks, engaging means connected to the elongated fastening means for engaging the openings in the lower portion of the pole, clamping means connected to the elongated fastening means for holding proximal ends against the pole.

Another object of the invention is to provide a book holding support means made of transparent plastic comprising a transparent front, bottom and back support.

Another object of the invention is to provide a back of the book holding support means flexibly arched against the front of the book holding support means to keep a book pressed tightly therebetween.

Another object of the invention is to provide a pole made of transparent plastic having an angular bevel with a sharpened circular edge.

Another object of the invention is to provide connecting means for connecting the pole to the book support means by a fastening screw.

Another object of the invention is to provide elongated fastening means connected to the pole parallel to the length of the pole.

Another object of the invention is to provide engaging means connected to the elongated fastening means at the proximal end which are securing dowels.

Another object of the invention is to provide securing dowels which are angularly fastened upward into the pole.

Another object of the invention is to provide distal ends of the legs which are curved upward.

Another object of the invention is to provide clamping means connected to the elongated fastening means for holding the proximal ends against the pole comprising a nylon locking ring.

Further objects of the invention are to provide a reading stand apparatus comprising a book holding support means, a pole having openings in a lower position for attaching legs, connecting means for connecting the pole to the book holding support means, a plurality of legs having elongated shank portions and proximal and distal ends, proximal ends having elongated fastening means connected to the pole at an angular relation to the shanks, engaging means connected to the elongated fastening means for engaging the openings in the lower portion of the pole, clamping means connected to the elongated fastening means for holding proximal ends against the pole.

A further object of the invention is to provide a pole having openings in a lower portion for attaching legs comprising narrow slots.

A further object of the invention is to provide elongated fastening means connected to the pole which are parallel to the length of the pole.

A further object of the invention is to provide engaging means connected to the elongated fastening means for engaging the openings in the lower portion of the pole comprising male projections.

A further object of the invention is to provide male projections which slide upward into the narrow slots.

Still a further object of the invention is to provide distal ends of the legs which are curved upward.

BRIEF DESCRIPTION OF THE DRAWINGS

FIG. 1 shows a front view of the leisure reader.

FIG. 2 shows a side view of the leisure reader without legs.

FIG. 3 shows a top view of the leisure reader with leg stands.

FIG. 4 shows a different embodiment of the leg stand.

FIG. 5 shows an enlarged view of the leg stand option #2.

DETAILED DESCRIPTION OF THE DRAWINGS

Referring to FIG. 1, leisure reader comprises Plexiglas book support 2 consisting of clear face 4 and back support 8 and clear Plexiglas pole 20. Plexiglas book support 2 is connected to pole 20 by three quarter inch bolt 10 which screws through hole 12 of the bottom 11 of Plexiglas book support 2. Bolt 10 screws into hole 14 of pole 20 to connect Plexiglas book support 2 to pole 20.

Pole 20 is angularly sliced to create elliptical opening 22 with sharpened circular edge 23. This allows pole 20 to be thrust into soft surfaces such as sand to provide vertical stability for book support 2. Leg stands 24 may be connected to pole 2 by inserting dowels 26 extending angularly upward from upper flange 27 of leg stands 24 into upwardly angled dowel hole 28 found in pole 20. To secure leg stands 24 firmly against pole 20, nylon locking ring 30 slides up over lower flanges 25 of leg stands 24. Nylon locking ring 30 keeps dowels 26 secured in dowel holes 28 and also keeps lower flanges 25 rigidly fixed on a line parallel to the length of the pole 20. Curved leg stand tips 32 provide stability for book support 2 and pole 20 when the leisure reader is used on a hard surface.

Referring to FIG. 2, book support 2 comprises clear face 4, bottom 11, and back support 8. Back support 8 comprises curved spring 18 and arched support 16. Curved spring 18 provides spring action which applies constant forward flexing pressure of arched support 16 against face 4 of book support 2. In this way a book may be held rigidly in place against the face 4 for easy reading. Bolt 10 screws through hole 12 in bottom 11 of book support 2. Bolt 10 is received by pole 20 via bolt hole 14. Book support is rigidly attached to pole 20. Dowel hole 28 is located approximately five inches above circular edge 25 of elliptical opening 22 of pole 20.

Referring to FIG. 3, leisure reader comprises book support face 4, back support 8, pole 20, and leg stands 24. Back support 8 comprises arched support 16 and curved spring 18 which applies forward pressure against book support face 4.

FIG. 4 shows a different embodiment of leg stands 24. In this embodiment dowel holes are replaced by narrow four inch rectangular slots 34, parallel along the length of pole 20. Male projections 36 are found on both upper and lower flanges 27 and 25 of leg stands 24. These projections 36 slide upward into rectangular slots 34 of pole 20. Curved leg stand tip 32 is identical to curved leg stand tip 32 found in FIG. 1.

FIG. 5 is an enlarged top view of leg stand 24 as shown in FIG. 4. Triangular shaped male projections 36 slide upward into slots 34 of pole 20. These slots replace dowel holes 28 in the embodiment of leg stands 24 as shown in FIG. 1.

While the invention has been described with reference to a specific embodiment, the exact nature and scope of the invention is defined in the following claims.

What is claimed:

1. A reading stand apparatus comprising a book holding support means, a pole having openings in a lower portion for attaching legs, connecting means for connecting the pole to the book holding support means, a plurality of legs having elongated shank portions and having proximal and distal ends, the proximal ends having elongated fastening means connected to the pole in upward angular relation to the shanks, securing dowels connected to the elongated fastening means at the proximal ends for engaging the openings in the lower portion of the pole, clamping means connected to the elongated fastening means for holding proximal ends against the pole.

2. The apparatus of claim 1 wherein
the book holding support means is made of transparent plastic comprising a transparent front, bottom and back support.

3. The apparatus of claim 1 wherein
the back of the book holding support means is flexibly arched against the front of the book holding support means to keep a book pressed tightly therebetween.

4. The apparatus of claim 1 wherein
the pole is made of transparent plastic and has an angular bevel with a sharpened circular edge.

5. The apparatus of claim 1 wherein elongated fastening means connected to the pole are parallel to the length of the pole.

6. The apparatus of claim 1 wherein the securing dowels are angularly fastened upward into the pole.

7. The apparatus of claim 1 wherein distal ends of the legs are curved upward.

8. The apparatus of claim 1 wherein clamping means connected to the elongated fastening means for holding the proximal ends against the pole comprises a nylon locking ring.

9. A reading stand apparatus comprising a book holding support means constructed of one piece transparent plastic having a flat front face, a flat bottom and a flexibly arched back continuously joined together wherein the flexibly arched back presses reading material tightly therebetween a pole connected to a bottom of the book holding support means having openings in a lower portion for attaching legs and having an angular bevel with a sharpened circular edge wherein the sharpened circular edge permits the pole to be implanted into soft ground.

10. The apparatus of claim 9, the pole having narrow slot openings in a lower portion for attaching legs.

11. The apparatus of claim 10 further comprising legs having elongated fastening means connected to the pole parallel to the length of the pole.

12. The apparatus of claim 10 further comprising male projections connected to the elongated fastening means for engaging the narrow slots in the lower portion of the pole.

13. The apparatus of claim 12 wherein the male projections slide upward into the narrow slots.

14. The apparatus of claim 10 wherein distal ends of the legs are curved upward.

* * * * *